(12) United States Patent
Lodge

(10) Patent No.: US 6,902,775 B2
(45) Date of Patent: *Jun. 7, 2005

(54) DECORATION METHOD

(76) Inventor: James Anthony Lodge, Wow House, 200 Conniburrow Boulevard., Conniburrow, Milton Keynes, Bucks (GB), MK 147 AH ( * ) Notice: Subject to any disclaimer, the term of this patent is extended or adjusted under 35 U.S.C. 154(b) by 0 days.

This patent is subject to a terminal disclaimer.

(21) Appl. No.: 10/745,138

(22) Filed: Dec. 23, 2003

(65) Prior Publication Data

US 2004/0137149 A1 Jul. 15, 2004

Related U.S. Application Data

(63) Continuation of application No. 10/078,024, filed on Feb. 15, 2002, now Pat. No. 6,759,099, which is a continuation of application No. 09/194,714, filed on Apr. 22, 1999, now abandoned.

(30) Foreign Application Priority Data

Jun. 17, 1998 (GB) ................................ PCT/GB98/01778

(51) Int. Cl.⁷ .............................. B05D 5/06; B05D 1/02

(52) U.S. Cl. ........................ 427/542; 427/258; 427/261; 427/287; 427/379; 427/389.7; 427/393.6; 427/407.2; 427/421

(58) Field of Search .................................. 427/258, 261, 427/287, 421, 393.6, 407.2, 542, 379, 389.7

(56) References Cited

U.S. PATENT DOCUMENTS

| | | | | |
|---|---|---|---|---|
| 4,156,365 A | * | 5/1979 | Heinmets et al. | ............ 374/162 |
| 4,743,398 A | * | 5/1988 | Brown et al. | ............ 252/408.1 |
| 4,917,643 A | * | 4/1990 | Hippely et al. | ................ 446/14 |
| 5,215,491 A | * | 6/1993 | Willet et al. | ................. 446/176 |
| 5,219,625 A | * | 6/1993 | Matsunami et al. | .......... 428/30 |

FOREIGN PATENT DOCUMENTS

| | | |
|---|---|---|
| EP | 0 523 888 A1 * | 1/1993 |
| EP | 0 677 564 A2 * | 10/1995 |

* cited by examiner

Primary Examiner—Kirsten Jolley
(74) Attorney, Agent, or Firm—Galgano & Burke, LLP

(57) ABSTRACT

A method of decorating an article, the method comprising mixing a thermochromic ink with a transparent lacquer, applying the mixture on to part or all of the surface of an article, once the mixture is set, applying a second layer of dishwasher proof transparent lacquer.

19 Claims, No Drawings

DECORATION METHOD

This application is a continuation application of U.S. application Ser. No. 10/078,024, filed Feb. 15, 2002, now U.S. Pat. No. 6,759,099, which is a continuation of U.S. application Ser. No. 09/194,714, filed Apr. 22, 1999, now abandoned.

This invention concerns a decoration method and particularly but not exclusively a decoration method usable on products such as items of tableware.

Presently a wide range of decoration methods and techniques are applied to items such as tableware, e.g. cups, plates, teapots etc. It is desirable to produce new affects in such decoration. It is also generally a requirement that such decorations should be durable and also dishwasher proof.

Thermochromic inks are materials which at a specified temperature change colour, or become transparent or at least translucent.

According to the present invention there is provided a method of decorating an article, the method comprising mixing a thermochromic ink with a first coating material, applying the mixture onto part or all of a surface of the article, once the mixture is set applying a second coating material onto said surface of the article.

The second coating material is preferably transparent. The second coating material is desirably substantially dishwasher proof.

The first coating material is preferably transparent.

The first and/or second coating materials preferably comprise lacquers. The first coating material preferably comprises an organic water based lacquer, though the lacquer could be acrylic based. The second coating material preferably comprises a two-part epoxy fortified acrylic resin, including an activator and a thinner.

The proportion of ink in the mixture is preferably within the range 5–25%.

The mixture and/or second coating material are preferably cured following application onto the article. The curing preferably commences with a period in an infra red shortwave drier followed by a heat cure. The heat cure preferably comprises a lower temperature first period, followed by a higher temperature second period. For the mixture, the first period preferably lasts between one and two minutes at 35° C. to 65° C., with the second period lasting eight to twelve minutes at 140 to 220° C. For the second coating the first period preferably lasts between eight and twelve minutes at 35 to 65° C., with the second period lasting twenty five to thirty minutes at 110 to 165° C.

A decoration may be provided on the article beneath the mixture such that when the thermochromic ink is at least translucent, said decoration is visible.

The mixture may comprise a plurality of thermochromic inks with different colour change temperatures, and the inks may be of different colours.

The mixture and/or second coating material may be applied to the article by spraying, and desirable electrostatic spraying. In the latter case, an electrostatic thinner may be added to the mixture and/or second coating prior to spraying.

The mixture and/or the second coating material are preferably sprayed to a thickness of between 12 and 24 microns.

An embodiment of the present invention will now be described by way of example only.

A ceramic teapot is formed, decorated and glazed in a conventional manner so as to have a pattern such as a series of fruit on it. A thermochromic outer layer is then applied as follows. A dark blue thermochromic ink is mixed with an organic water-based lacquer with 5 to 25% of the ink, dependent on the strength of colour required. An electrostatic thinner is added to the mixture which is then applied by electrostatic spraying using an RD-3000 Turbodisc system. The mixture is sprayed to provide a 20 micron layer.

This layer is then cured by an initial pass through an infra red shortwave drier and then a subsequent pass through a gas convection drier or driers with an initial first stage of one to two minutes at 35 to 65° C., and a second stage lasting eight to twelve minutes at 140 to 220° C.

A transparent outer coating is then applied to the teapot as follows. A two-part epoxy fortified acrylic resin is mixed together and applied by electrostatic spraying in a similar manner to the first layer outlined above. This second layer is then cured again with a first pass through a shortwave infra red drier and then subsequent passes through a gas convection drier initially for eight to twelve minutes at 35 to 65° C., and then twenty five to thirty nutes at 110 to 165° C.

The finished product has a durable glossy finish which is substantially dishwasher proof. At room temperature the teapot is dark blue. When boiling water is added the thermochromic ink changes to a substantially transparent state such that the fruit pattern beneath the thermochromic coating can be dearly seen. As the teapot subsequently cools, the dark blue colouring will return to again obscure the fruit pattern.

There is thus described a decoration method which permits items such as ceramic tableware to be readily decorated in a relatively straightforward manner with a novel decoration. In view of the good finish provided by the decoration and the fact that it is substantially dishwasher proof, the decoration does not detract from the product and provides considerable enhancement with the decoration.

It is to be realised that a wide range of decorations can be provided using a method according to the present invention, to provide for example decorations which appear or disappear at below or above room temperature. These decorations can selectively obscure decorations, messages etc. therebeneath. It is possible for a plurality of different inks with different colour change temperatures and perhaps also different colours to be mixed, such that a decoration can pass from one colour perhaps to reveal a pattern or decoration therebeneath, and subsequently to move to a further colour as the temperature rises or falls. A wide range of colours can be used as is available.

Various other modifications may be made without departing from the scope of the invention. For example, the coatings could be applied by different techniques and perhaps only to cover part of the surface of an article to provide particular effects. Different spraying and/or curing conditions can be used etc., as are appropriate to particular materials used. The technique whilst ideally suited to decorating tableware, can be used on a wide range of articles.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A method of decorating an article of glazed tableware comprising the steps of:
   (a) mixing a thermocromic ink with a first coating material to form a first coating mixture;
   (b) applying the first coating mixture directly onto substantially the whole outer surface of the tableware article by spraying;

(c) once the first coating mixture is set, applying a second transparent coating material over the first coating mixture.

2. A method according to claim 1, wherein the first coating material is transparent.

3. A method according to claim 1, wherein the first and/or second coating materials comprise lacquers.

4. A method according to claim 3, wherein the first coating material comprises a water based lacquer.

5. A method according to claim 3, wherein the second coating material comprises a two-part epoxy fortified acrylic resin, including an activator and a thinner.

6. A method according to claim 1, wherein the proportion of ink in the mixture is within the range 5–25% by volume.

7. A method according to claim 1, wherein the mixture and/or second coating material are cured following application onto the article.

8. A method according to claim 7, wherein the curing commences with a period in an infra red shortwave drier followed by a heat cure.

9. A method according to claim 1, wherein the curing includes a heat cure comprising a lower temperature first period, followed by a higher temperature second period.

10. A method according to claim 9, wherein for the mixture, the first period lasts between one and two minutes at 35° to 65° C., with the second period lasting eight to twelve minutes at 140° to 220° C.

11. A method according to claim 1, wherein for the second coating the first period lasts between eight and twelve minutes at 35° to 65° C., with the second period lasting twenty five to thirty minutes at 110° to 165° C.

12. A method according to claim 1, wherein a decoration is provided on the article beneath the mixture such that when the thermochromic ink is at least translucent, said decoration is visible.

13. A method according to claim 1, wherein the mixture comprises a plurality of thermochromic inks with different colour change temperatures.

14. A method according to claim 13, wherein the inks are different colours.

15. A method according to claim 1, where said second coating material is applied to the article by spraying.

16. A method according to claim 15, wherein the mixture and/or second coating material are applied to the article by electrostatic spraying.

17. A method according to claim 16, wherein an electrostatic thinner is added to the mixture and/or second coating prior to spraying.

18. A method according to claim 15, wherein the mixture and the second coating material are sprayed to a thickness of between 12 and 24 microns.

19. The method according to claim 1, wherein an electrostatic thinner is added to at least one of said mixture and said second coating material prior to spraying.

* * * * *